United States Patent [19]

Yumde et al.

[11] 3,758,708

[45] Sept. 11, 1973

[54] COLOR TELEVISION SYSTEM FOR CONVERTING SEQUENTIAL COLOR TELEVISION SIGNALS INTO SIMULTANEOUS COLOR TELEVISION SIGNALS

[75] Inventors: Yasufumi Yumde, Saitama-ken; Akiyoshi Iyama, Sagamihara; Toshi Ito, Tokyo; Toshihiko Nakajima, Hino, all of Japan

[73] Assignee: Hitachi, Ltd., Tokyo, Japan

[22] Filed: Mar. 30, 1971

[21] Appl. No.: 129,535

[30] Foreign Application Priority Data

Mar. 31, 1970 Japan ............................ 45/27285

[52] U.S. Cl. ............................................ 178/5.4 C

[51] Int. Cl. ............................................ H04n 9/42

[58] Field of Search .................. 178/5.2, 5.4, 5.4 C, 178/5.4 CD, 6.6 A

[56] References Cited

UNITED STATES PATENTS

| | | | |
|---|---|---|---|
| 3,506,775 | 4/1970 | McMann, Jr. .................... | 178/5.4 C |
| 3,402,257 | 9/1968 | De Lange ...................... | 178/6.6 A |
| 3,600,504 | 8/1971 | Reilly ........................... | 178/5.4 C |
| 3,524,012 | 8/1970 | Kihara .......................... | 178/5.4 CD |

*Primary Examiner*—Richard Murray
*Attorney*—Craig, Antonelli, Stewart & Hill

[57] ABSTRACT

A color television system for converting sequential color television signals produced by a color television camera into simultaneous color television signals is disclosed, in which the scene is televized sequentially in red, green and blue colors one color per field after another to produce sequential color signals respectively responsible for red, green and blue colors, the produced color signals being successively recorded in a recorder. One of the red, green and blue color signals is taken out directly from the camera, while the two remaining color signals are simultaneously taken out of the recorder so as to provide three simultaneous color television signals.

14 Claims, 14 Drawing Figures

Patented Sept. 11, 1973 3,758,708

12 Sheets-Sheet 1

INVENTOR
YASUFUMI YUMDE, AKIYOSHI IYAMA
TOSHI ITO and TOSHIHIKO NAKAJIMA

BY Craig, Antonelli, Stewart & Hill
ATTORNEY

INVENTOR
YASUFUMI YUMDE, AKIYOSHI IYAMA,
TOSHI ITO and TOSHIHIKO NAKAJIMA

BY Craig, Antonelli, Stewart & Hill
ATTORNEY

INVENTOR

YASUFUMI YUMDE, AKIYOSHI IYAMA,

TOSHI ITO and TOSHIHIKO NAKAJIMA

BY Craig, Antonelli, Stewart & Hill

ATTORNEY

Patented Sept. 11, 1973 3,758,708

12 Sheets-Sheet 4

INVENTOR

YASUFUMI YUMDE, AKIYOSHI IYAMA,

TOSHI ITO and TOSHIHIKO NAKAJIMA

BY Craig, Antonelli, Stewart & Hill

ATTORNEY

Patented Sept. 11, 1973 3,758,708

12 Sheets-Sheet 5

INVENTOR

YASUFUMI YUMDE, AKIYOSHI IYAMA,

TOSHI ITO and TOSHIHIKO NAKAJIMA

BY Craig, Antonelli, Stewart & Hill

ATTORNEY

Patented Sept. 11, 1973 3,758,708

12 Sheets-Sheet 6

INVENTOR

YASUFUMI YUMDE, AKIYOSHI IYAMA,

TOSHI ITO and TOSHIHIKO NAKAJIMA

BY Craig, Antonelli, Stewart & Hill

ATTORNEY

Patented Sept. 11, 1973 3,758,708

12 Sheets-Sheet 7

INVENTOR

YASUFUMI YUMDE, AKIYOSHI IYAMA,

TOSHI ITO and TOSHIHIKO NAKAJIMA

BY Craig, Antonelli, Stewart & Hill

ATTORNEY

Patented Sept. 11, 1973 3,758,708

12 Sheets-Sheet 8

INVENTOR

YASUFUMI YUMDE, AKIYOSHI IYAMA,

TOSHI ITO and TOSHIHIKO NAKAJIMA

BY Craig, Antonelli, Stewart & Hill

ATTORNEY

Patented Sept. 11, 1973 3,758,708

INVENTOR

YASUFUMI YUMDE, AKIYOSHI IYAMA,

TOSHI ITO and TOSHIHIKO NAKAJIMA

BY Craig, Antonelli, Stewart & Hill

ATTORNEY

Patented Sept. 11, 1973 3,758,708

INVENTOR
YASUFUMI YUMDE, AKIYOSHI IYAMA,
TOSHI ITO and TOSHIHIKO NAKAJIMA

BY Craig, Antonelli, Stewart & Hill
ATTORNEY

Patented Sept. 11, 1973 3,758,708

12 Sheets-Sheet 11

*INVENTOR*

YASUFUMI YUMDE, AKIYOSHI IYAMA,

TOSHI ITO and TOSHIHIKO NAKAJIMA

BY Craig, Antonelli, Stewart & Hill

ATTORNEY

INVENTOR
YASUFUMI YUMDE, AKIYOSHI IYAMA,
TOSHI ITO and TOSHIHIKO NAKAJIMA

BY Craig, Antonelli, Stewart & Hill
ATTORNEY

COLOR TELEVISION SYSTEM FOR CONVERTING SEQUENTIAL COLOR TELEVISION SIGNALS INTO SIMULTANEOUS COLOR TELEVISION SIGNALS

The present invention relates to color television systems and, more particularly, to color television systems for converting sequential color television signals produced by a single image pick-up tube into simultaneous color television signals.

Color television systems for producing simultaneous color television signals such as the NTSC system include three-tube systems and four-tube systems. The former systems employ three independent image pick-up tubes simultaneously producing color television signals for red (R), green (G) and blue (B) parts of color information in the scene. In the latter systems a further image pick-up tube is separately provided for producing the luminance signal. In these systems the individual tubes are simultaneously operated, so that such complicated maintenance as color registration adjustment and white adjustment is required. Also, the optical system for the color separation requires a complicated construction. Therefore, these systems present many inconveniences in practical use in industry and for civil use purposes in regarding their economy and complexity.

Meanwhile, there have heretofore been proposed sequential color television systems employing a single image pick-up tube. However, these systems cannot be put to practice unless the frame rate is increased to an extent sufficient to ensure illusion. This necessitates disregarding the compatibility with the NTSC system, which is impossible at present.

An object of the invention is to provide a novel color television system for converting sequential color television signals into simultaneous color television signals.

Another object of the invention is to provide a small-size, light-weight and inexpensive color television system, which can be combined with video tape recorders for industrial and public welfare purposes.

A further object of the invention is to provide a color television system, which can ensure excellent color reproducibility, and enables excellent phase control of the rotary parts involved, and whose performance may be maintained without requiring any adjustment.

To achieve the above objects, a color television system according to the invention comprises camera means to televize scenes in a sequential manner in one color per field after another through a rotary color filter successively permitting three different colors which can reproduce the original color when combined together, means to record the successive color signal output of the camera means, means to derive one of the three color signals from the camera means and simultaneously derive the remaining two color signals from the recording means, and means to delay one of the two color signals derived from the recording means by one-half the horizontal scanning period.

The present invention will become more apparent from the following detailed description of the preferred embodiments of the present invention when taken in conjunction with the accompanying drawings, in which.

Figure 1:
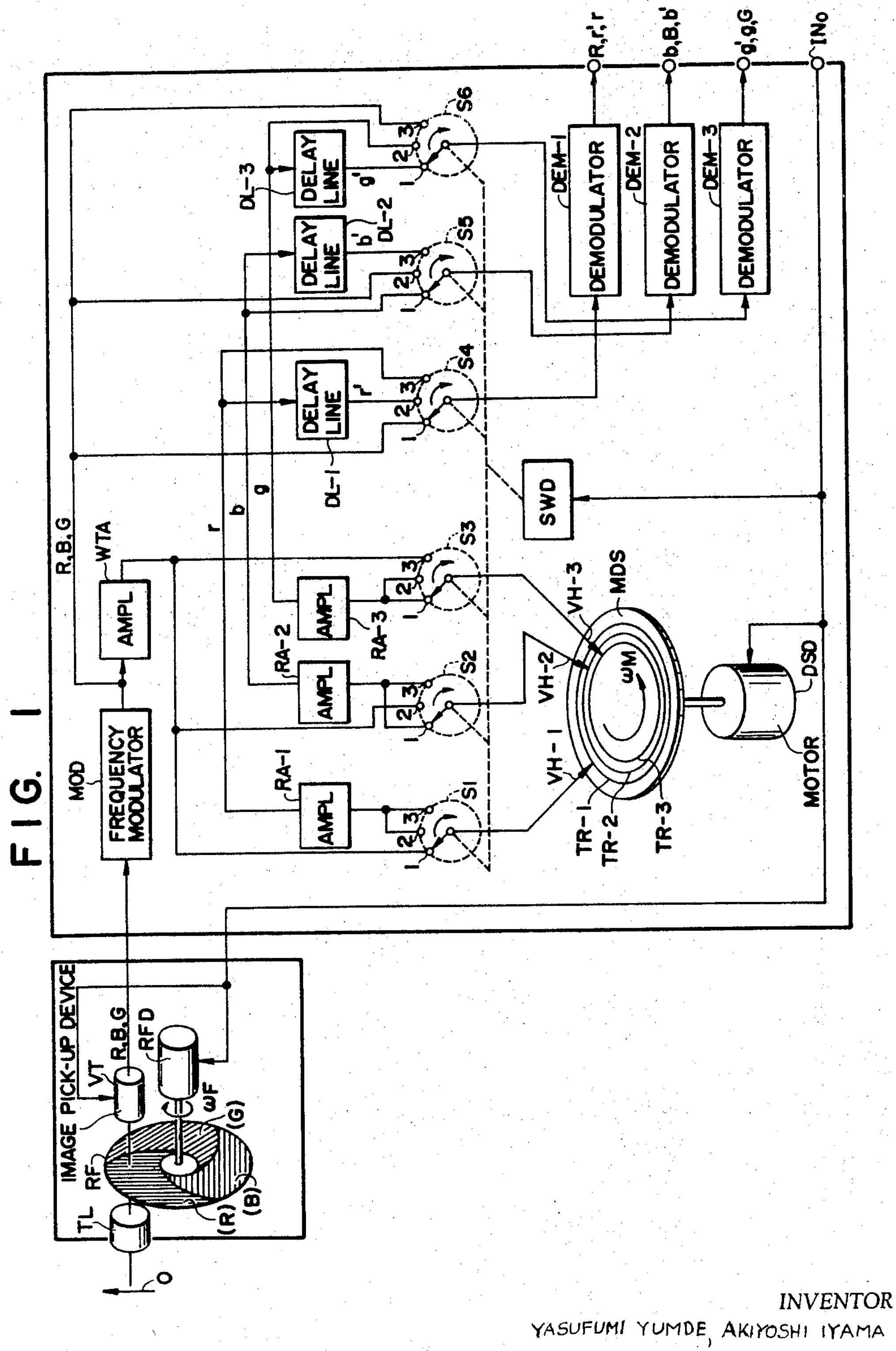
FIG. 1 is a schematic representation of one embodiment of this invention.

Referring now to FIG. 1 showing one embodiment of the invention, light from a scene O is focused through a lens TL of the television camera on the image pick-up face of an image pick-up device VT. As the image pick-up device a vidicon, image orthicon, plumbicon, solid state image pick-up device, etc. may be used. Between the lens TL and the image pick-up device VT is disposed a rotary color filter RF, which is driven by a rotary color filter drive RFD in synchronism with an external synchronous drive signal and with the field scanning in the image pick-up device VT. In the NTSC system (with 525 horizontal lines per frame and 60 fields per second in the Japanese standard television system) for example, the color filter RF should be rotated at an angular speed $\omega_F$ expressed as $$\omega_F = 2\pi \cdot (60/3n) \text{ rad/sec} \quad (1)$$

where $n$ is the number of sets of red (R), green (G) and blue (B) passing portions in the filter. In the filter RF shown in FIG. 1, $n = 1$. Thus, the filter RF is rotated at 20 rps. The color combination for the filter set is not limited to that of red, green and blue, but any combination of constituent colors capable of reproducing the original color when added together, for instance the set of cyan, yellow and magenta or the set of cyan, yellow and colorless, may be adopted. Also, the order of appearance of the member colors in the set may be arbitrary.

Figure 2:
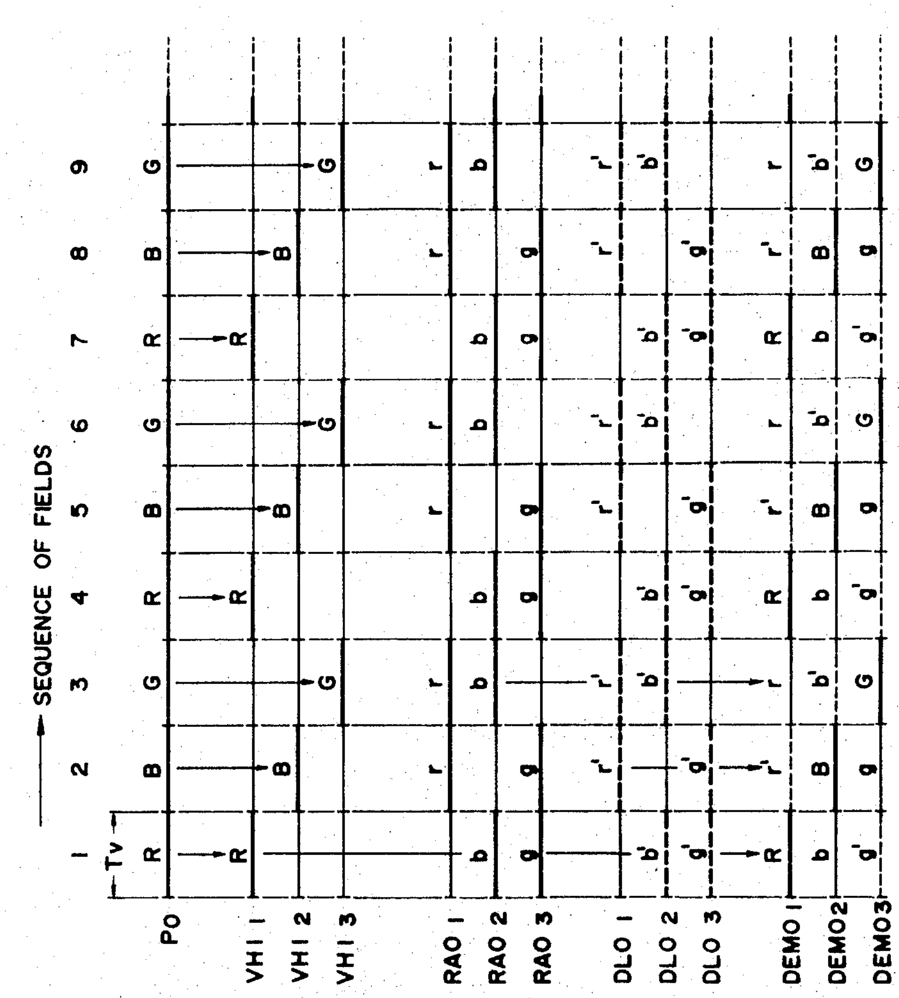
FIGS. 2 and 3 are time charts illustrating the operation of the embodiment of FIG. 1.

With the construction described above, sequential color television signals are obtained as the output of the image pick-up device VT, which is shown at $P_0$ in FIG. 2. The period $T_v$ for each of the R, B and G signals corresponds to one field, that is, one vertical scan period.

The sequential R, B and G signals $P_0$ appearing from the image pick-up device VT are modulated by a frequency modulator MOD into signals suited for magnetic recording. The output of the frequency modulator MOD is amplified by a magnetic write-in amplifier WTA, whose output is impressed on contact 1 of an electronic switch $S_1$, contact 2 of an electronic switch $S_2$ and contact 3 of an electronic switch $S_3$. Also the output of the frequency modulator MOD is directly impressed on contact 1 of an electronic switch $S_4$, contact 2 of an electronic switch $S_5$ and contact 3 of an electronic switch $S_6$. The contacts of each of the electronic switches $S_1$ to $S_6$ are successively switched in the order of 1, 2, 3 and back to 1 in synchronism with the rotation of the filter RF by an electronic switch drive SWD. The electronic switches $S_1$, $S_2$ and $S_3$ are connected to respective electricity-magnetism converting elements VH–1, VH–2 and VH–3 (which may be magnetic heads, for example), while the electronic switches $S_4$, $S_5$ and $S_6$ are connected to respective demodulators DEM–1, DEM–2 and DEM–3 to demodulate the frequency modulated signals. The contacts 2 and 3 of the switch $S_1$ are connected to an input terminal of a magnetic read-out amplifier RA–1, whose output terminal is connected through a delay line DL–1 (providing a delay time of one-half the horizontal scanning period ½H) to the contact 2 of the switch $S_4$ and also directly to the contact 3 of the switch $S_4$. The contacts 1 and 3 of the switch $S_2$ is connected to an input terminal of a magnetic read-out amplifier RA–2, whose output terminal is connected through another ½H delay line DL–2 to the contact 3 of the switch $S_5$ and also directly to the contact 1 of the switch $S_5$. The contacts 1 and 2 of the switch $S_3$ are connected to an input terminal of a magnetic read-out amplifier RA–3, whose output terminal is connected through a ½*H* delay line DL–3 to the contact 1 of the switch $S_6$ and also directly to the contact 3 of the switch $S_6$.

The sequential signals appearing at the output of the magnetic write-in amplifier WTA, that is, the signal $P_O$ in FIG. 2 consisting of sequential signals of R, B, G, R, . . . , are successively fed through the electronic switches $S_1$, $S_2$ and $S_3$, which are driven in synchronism to these signals, to the electricity-magnetism converting elements VH–1, VH–2 and VH–3 for recording on a rotary magnetic disk MDS. The input signals to the converting elements VH–1, VH–2 and VH–3 are respectively shown at $VHI_1$, $VHI_2$ and $VHI_3$ in the time chart of FIG. 2. The rotary magnetic disk MDS in this embodiment may be replaced with other types of magnetic memories such as a magnetic sheet, magnetic tape and delay line which provide functions described hereinafter. This rotary magnetic disk MDS is driven by a magnetic disk driver DSD in synchronism to the rotation of the rotary color filter RF at such a speed that the video signal just for one field period $Tv$ is written in the rotary magnetic disk MDS as it completes one rotation. In the NTSC system, or more particularly in this embodiment using the rotary color filter RF of the above construction, it is rotated in synchronism with the filter at the speed of 60 rpm ($\omega_M = 2\pi \cdot 60$ rad/sec). The rotary parts and the switches described above are driven by a drive signal impressed upon the input terminal $IN_O$. Thus, the R, B and G signals $VHI_1$, $VHI_2$ and $VHI_3$ sequentially impressed on the electricity-magnetism converting elements VH–1, VH–2 and VH–3 are written on the respective magnetic tracks TR–1, TR–2 and TR–3 in the rotary magnetic disk MDS in the form of corresponding residual magnetism patterns.

The video signals thus written in the rotary magnetic disk MDS are detected by the electricity-magnetism converting the elements VH–1, VH–2 and VH–3 and read out by the magnetic read-out amplifiers RA–1, RA–2 and RA–3.

When the scene is being televized in red color, for instance, in the synchronous rotation of the magnetic disk MDS the write-in signal for red information from the write-in amplifier WTA is written through the contact 1 of the switch $S_1$ and the converting element VH–1 in the recording track TR–1. At the end of this synchronous rotation of MDS the contact 1 of the switch $S_1$ is switched over to the contact 2, and in the next synchronous rotation of MDS the previously written signal in the form of a corresponding residual magnetism pattern is read out as the converting element VH–1 again traces the track TR–1 to provide read-out signal $r$ available from the read-out amplifier RA–1. In the third synchronous rotation of MDS, the same read-out operation is repeated this time through the contact 3 of the switch $S_1$ to provide read-out signal $r$. In the fourth synchronous rotation of MDS, new information is written in through the contact 1 of the switch $S_1$. In this manner, the sequence of write-in, first read-out and second read-out operations are repeated. Similar repetitive sequences takes place at the recording track TR–2 for blue information and at the recording track TR–3 for green information. However, the contacts of the switch $S_2$ are arranged such that the sequence for the blue information lags behind the sequence for the red information by one rotation of MDS, that is, one field period. In other words, the sequence of second read-out, write-in and first read-out operations in the order mentioned takes place for the blue information concurrently with the afore-mentioned sequence for the red information. Also, the contacts of the switch $S_3$ are arranged such that the sequence for the green information lags behind the sequence for the red information by two rotations of MDS, so the sequence of first read-out, second read-out and write-in operations takes place for the green information concurrently with the afore-said sequence for the red information. Thus, the magnetic read-out amplifiers RA–1, RA–2 and RA–3 provide outputs respectively shown at $RAO_1$, $RAO_2$ and $RAO_3$ in FIG. 2. These outputs are delayed by ½H through the delay lines DL–1, DL–2 and DL–3 to provide outputs as shown at $DLO_1$, $DLO_2$ and $DLO_3$ in FIG. 2. In the time chart of FIG. 2, however, it is not clearly shown that the outputs $DLO_1$, $DLO_2$ and $DLO_3$ are shifted in time from the respective outputs $RAO_1$, $RAO_2$ and $RAO_3$ by ½*H*, since the interval ½H is extremely short compared to one field period. This aspect is shown in detail in FIG. 3.

The color signal outputs of the switches $S_4$, $S_5$ and $S_6$, whose contacts are appropriately switched in a synchronized fashion, are fed to the respective demodulators DEM–1, DEM–2 and DEM–3, so that these demodulators provide continuous output signals as shown at DEMO–1, DEMO–2 and DEMO–3 in FIG. 2. For the demodulator DEM–1, for example in the afore-mentioned first synchronous rotation of the rotary magnetic disk MDS the R signal from the modulator MOD is directly fed through the contact 1 of the switch $S_4$ to DEM–1, in the second synchronous rotation of MDS the output $DLO_1$ ($r'$) of the delay line DL–1 is fed, and in the third synchronous rotation of MDS the output $RAO_1$ ($r$) of the read-out amplifier RA–1 is fed. In other words, the demodulator DEM–1 receives a repetitive signal R–$r'$–$r$. For the demodulators DEM–2 and DEM–3, the sequence of events is delayed respectively by one rotation and two rotations of MDS, so they receive respective repetitive signals $b$–$B$–$b'$ and $g'$–$g$–$G$. In the above manner, with a single continuous sequential-color signal three continuous simultaneous-color signals may be obtained.

The description has so far been concerned with the manner of converting sequential color signals into simultaneous color signals. Now, the role of the ½H delay lines DL–1, DL–2 and DL–3 will be described with reference to FIG. 3.

Figure 3:
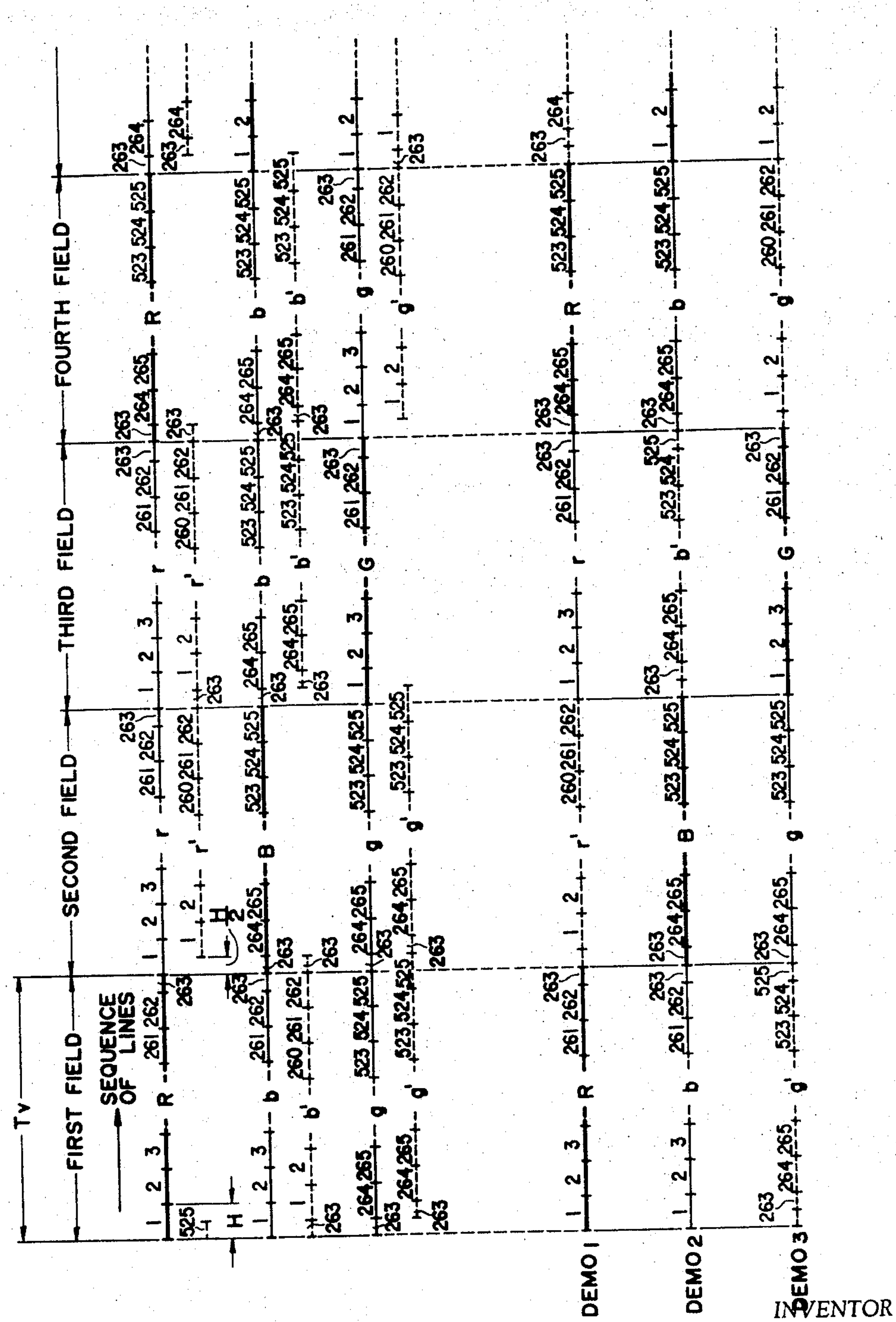

As is well known, in the standard television system the horizontal lines of one of the two fields constituting one frame are interlaced with the horizontal lines of the other. Thus, in this embodiment every other one of the sequential R, B and G signals as the output of the image pick-up device VT, that is, the signals for the successive first, second and third fields, are adapted to be selectively shifted in time by ½H by appropriately synchronizing the rotation of the rotary color filter RF with respect to the scanning in the image pick-up device. As shown in FIG. 3, the sequential outputs R, B and G (bold lines) available from the image pick-up device VT are shifted in time for every other field by ½H. In the Figure, the phase relation among the outputs R, B, G, *r*, *b*, *g*, *r'*, *b'* and *g'* is shown in detail. Numerals 1, 2, . . . 525 represent serial numbers for the horizontal lines. It will be seen that there are 525/2 horizontal lines in one T*v* field.

Although the sequential signals from the image pick-up device VT are selectively shifted in time for every other field by ½H to meet the interlace requirement, the phase of the signal written in the rotary magnetic disk MDS is maintained at the time of read-out. For example, the phase of the read-out signal *r* taken out in the second and third fields is the same as that of the write-in signal R recorded in the first field. The same relation also applies to the B and G signals. This means that in a field, for instance in the second field, the B and *g* signals are in the same phase, initiating at the middle of one horizontal line, but the remaining *r* signal is out of phase, initiating at the start of one horizontal line. Thus, with these signals *r*, B and *g* the original color of the scene cannot be faithfully reproduced. Therefore, it is necessary to render the *r* signal in phase with the other B and *g* signals. This role is taken by the ½H delay line DL–1, which provides output signal *r'* (corresponding to $DLO_1$ in FIG. 2). The phase of *r'* is the same as that of B and *g*, so that the original color of the scene may be faithfully reproduced. In FIG. 3, the phase relation among the outputs $DEMO_1$, $DEMO_2$ and $DEMO_3$ of the respective demodulators DEM–1, DEM–2 and DEM–3 is also shown in detail. It can still be seen that these three primary color signals are in the same phase and are simultaneously shifted in time for every other field by ½*H*.

In the preceding embodiment, the ½H delay lines, which are exclusively provided for the individual red, blue and green channels, are rendered operative only once in three successive fields. As an alternative, it is possible to use only one such ½H delay line for all the channels in combination with a switch means, which may be driven in synchronism with the other electronic switches from the switch drive SWD.

Figure 4:
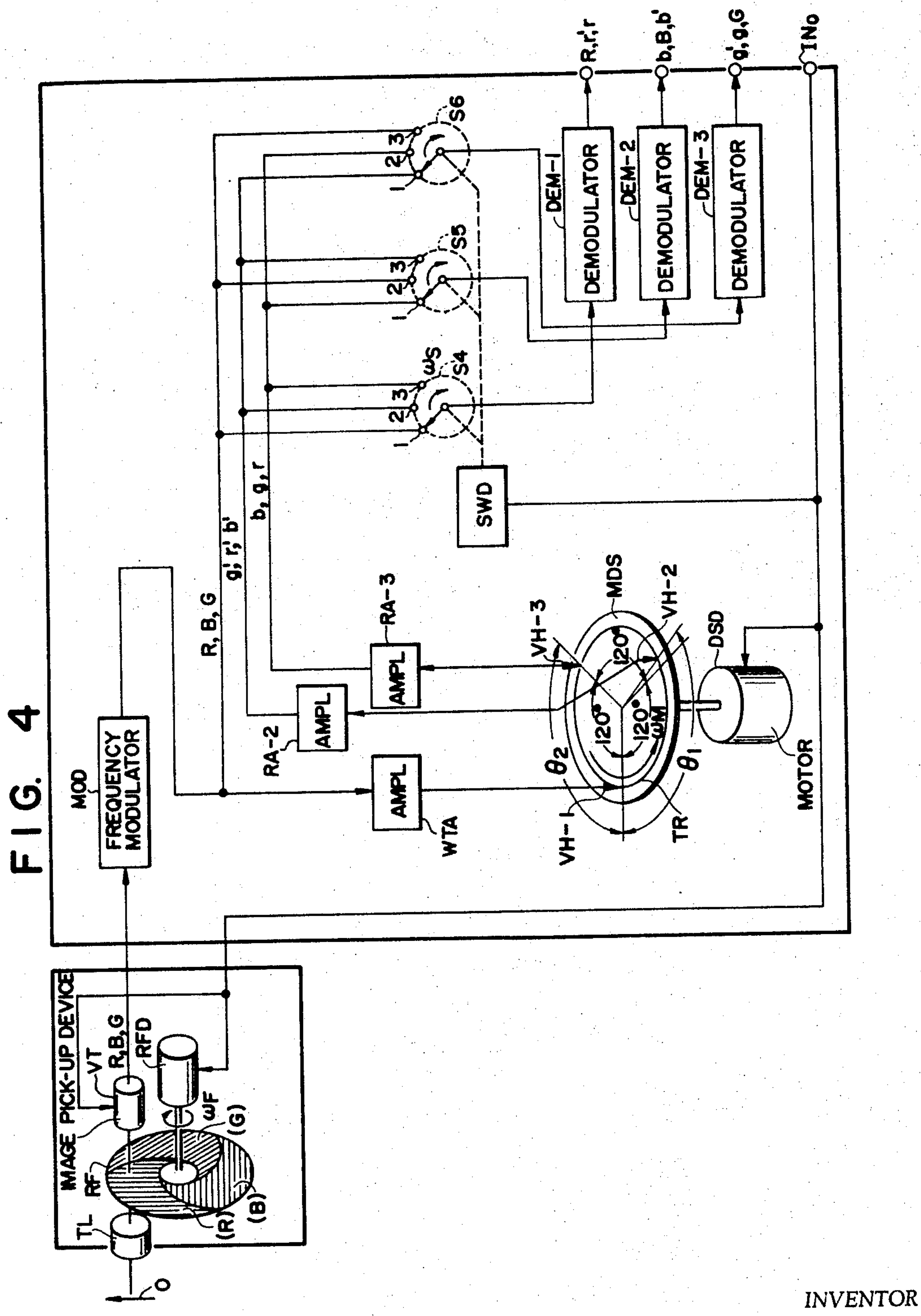
FIG. 4 is a schematic representation of another embodiment of the invention.

FIG. 4 shows another embodiment, in which the signal phase matching is effected without using the ½H delay line. In the Figure, like parts to those in FIG. 1 are designated by like reference characters. In this embodiment, the phase matching is effected in the stage of writing and reading the signals in and out of the rotary magnetic disk MDS.

Figure 5:
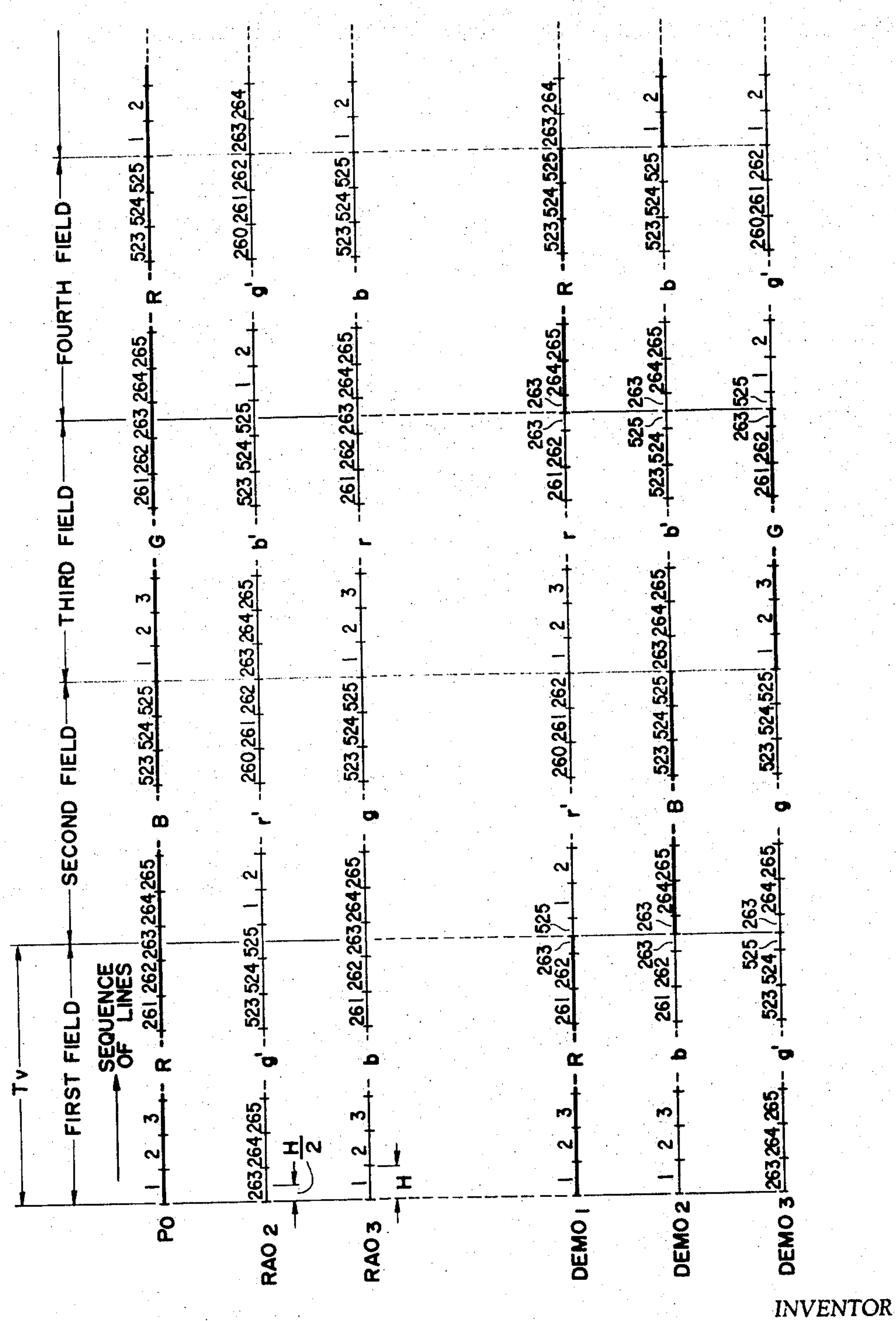
FIG. 5 is a time chart illustrating the operation of the embodiment of FIG. 4.

The sequential color signals R, B and G from the modulator MOD are amplified by the write-in amplifier WTA, whose output is recorded through a magnetic head VH–1 on the rotary magnetic disk MDS in the form of a magnetic track TR. The magnetic disk MODS is rotated at the same speed as that of the rotary color filter RF (with angular speed $\omega_M = 2\pi\cdot 60/3$ rad/sec). Thus, the continuous R, B and G sequential-color signal, that is, a length of signal for three fields, is recorded by the head VH–1 in the magnetic disk MDS as MDS completes one rotation. By arranging that the magnetic disk MDS is rotated in the direction of the arrow and that magnetic heads VH–1 and VH–2 are held at respective angles $\theta_1$ and $\theta_2$ given as $$\theta_1 = \tfrac{2}{3}\pi \pm \omega_M\cdot\tfrac{1}{2}H \text{ rad and } \theta_2 = \tfrac{2}{3}\pi \text{ rad} \qquad (2)$$

with respect to the magnetic head VH–1, the signals read out by the heads VH–2 and VH–3 and available at the read-out amplifiers RA–1 and RA–2 are as shown at $RAO_2$ and $RAO_3$ in FIG. 5. It will be seen that the output signal $RAO_2$ from the amplifier RA–2 lags behind the write-in signal $P_O$ by $T_v + ½H$, and the output signal $RAO_3$ from the amplifier RA–3 lags behind $P_O$ by $2T_v$. By feeding these output signals in the same manner as is described earlier through the electronic switches $S_4$, $S_5$ and $S_6$ to the demodulators DEM–1, DEM–2, and DEM–3, the simultaneous demodulator outputs $DEMO_1$, $DEMO_2$ and $DEMO_3$ are held in the same phase and are simultaneously shifted in time for every other field by ½H.

Figure 6:
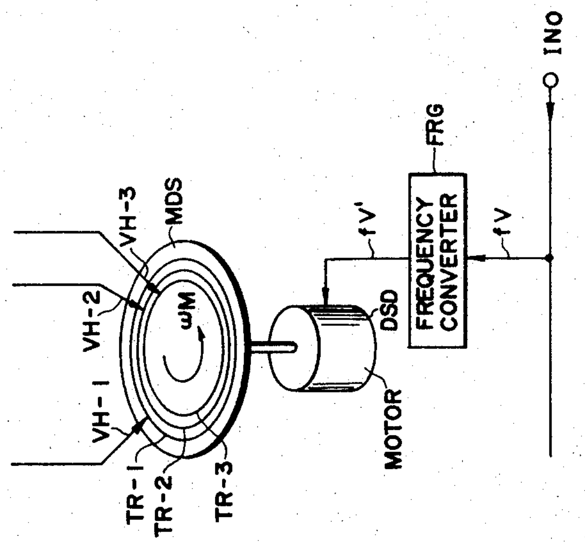
FIG. 6 is a schematic representation of part of a further embodiment of the invention.
Figure 7:
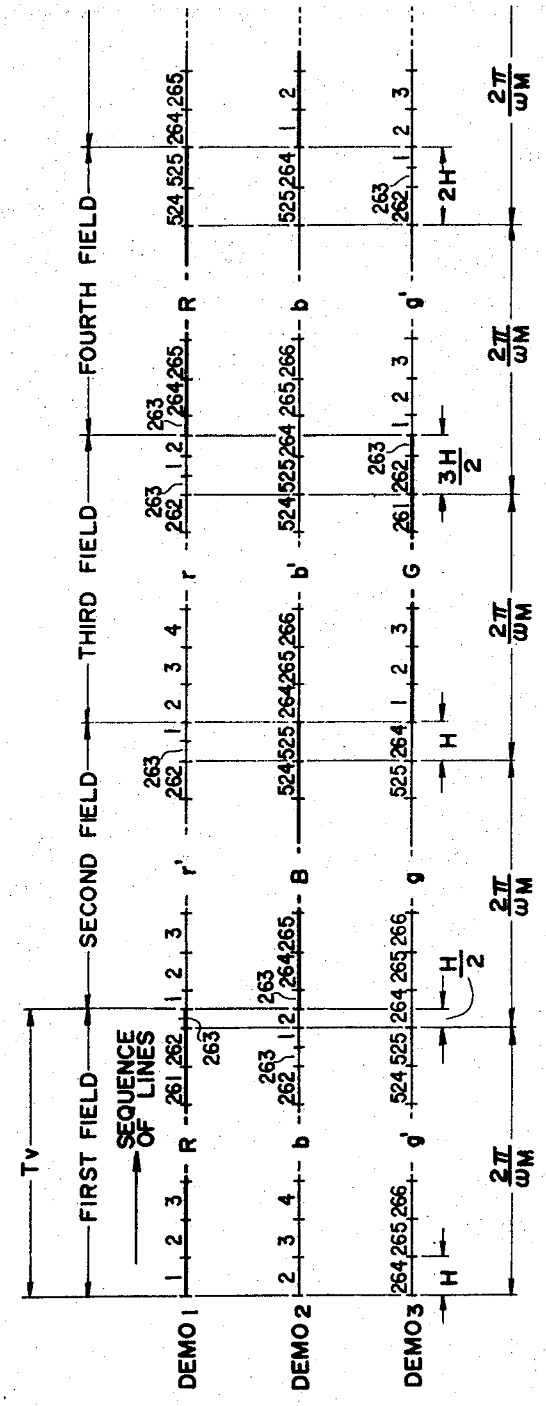
FIG. 7 is a time chart illustrating the operation of the embodiment of FIG. 6.

FIG. 6 shows part of a further embodiment of the invention. In the Figure, the same parts as those in FIG. 1 are designated by like reference characters. In this embodiment, the construction is the same as that of the embodiment of FIG. 1 except that the ½H delay lines DL–1, DL–2 and DL–3 are dispensed with, and that a frequency converter FRG is incorporated. In this embodiment, the time shifting of the simultaneous signals by ½H for every other field is achieved by appropriately controlling the magnetic disk drive DSD. In the embodiment of FIG. 1, the DSD is synchronized to the frequency ($f_v = 1/T_v$) of the vertical synchronizing signal. In this embodiment, the frequency $f_v$ is changed by the frequency converter FRG into a frequency $f'_v$ given as $$f'_v = f_v \cdot 2f_H/(2f_H + f_v) \qquad (3)$$

where $f_H = 1/H$ (*H* is one horizontal scanning line period), and the DSD is synchronized to the changed frequency $f'_v$. This means that the cycle of the rotary magnetic disk MDS is $T_v \pm ½H$, which is different from the cycle $T_v$ of the rotary color filter RF by ½*H*. With reference to the time chart of FIG. 7, the red signal R, for instance, which has been recorded in the first field, is shifted by ½*H* when it is read out in the second field as the signal *r'*, and is further shifted by ½H when it is read out in the third field as the signal *r*. The same applies to the blue and green signals B and G. Thus, the demodulators DEM–1, DEM–2 and DEM–3 can provide simultaneous outputs $DEMO_1$, $DEMO_2$ and $DEMO_3$ in the same phase and are simultaneously shifted by ½*H* for every other field. Although in this embodiment the magnetic disk drive DSD is controlled by changing the frequency $f_v$ into $f'_v$ by means of the frequency converter FRG. The DSD control may be made in a different manner. For example, a speed control head may be separately provided to the rotary magnetic disk MDS and a speed control track may be formed in the MDS, in which track $(2f_H/f_v) \pm 1$ pulses per one rotation of the MDS may be recorded. With this arrangement, by synchronizing the read-out signals to the external synchronizing signal at $2f_H$ the rotation cycle of the MDS may be changed from $T_v$ by ½$H$.

Figure 8:
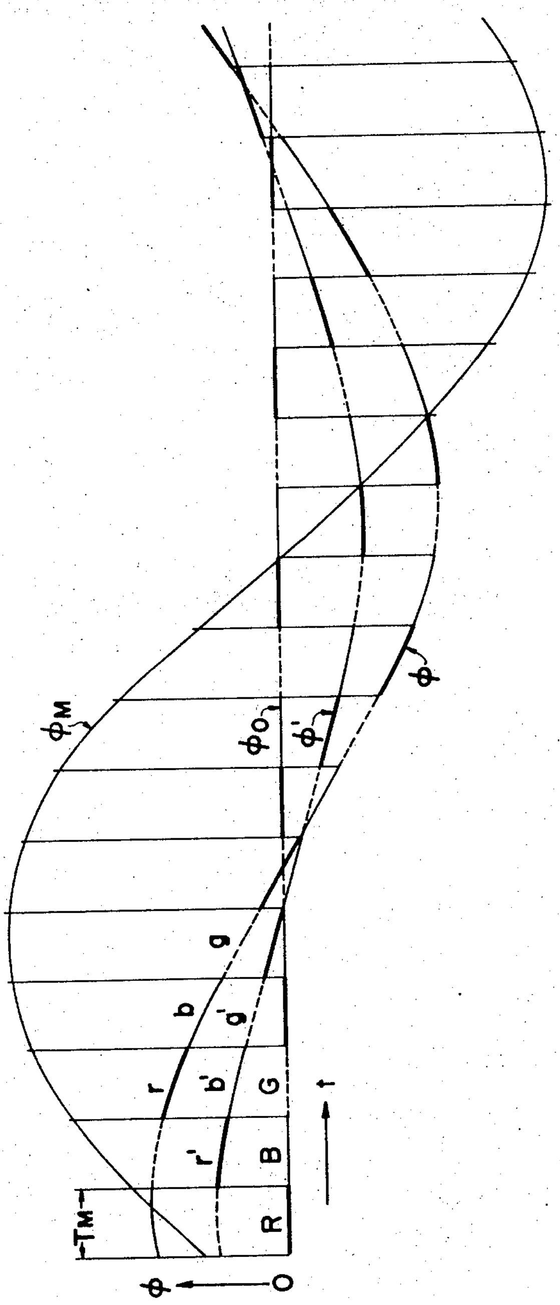
FIG. 8 is a graph showing phase errors involved in the rotary drive.

In any of the preceding embodiments, the image pick-up device, electronic switches and rotary magnetic disks are all driven in accordance with the external drive signal impressed upon the terminal $IN_O$. If it is not required to simultaneously and synchronously drive two or more image pick-up devices but a single closed loop may be formed, the drive signal may be produced from the synchronizing signal recorded in the magnetic disk MDS or memory in general. In this case, it is possible to allow for the variation of the angular speed of the magnetic disk MDS and nevertheless obtain simultaneous color signals in the same phase. This permits reducing the precision of the DSD control and simplifies the construction of the system.

Where the memory, for instance magnetic disk, is driven by an external synchronous drive signal, if the rotation of the magnetic disk involved phase variation $\phi$M with respect to the phase $\phi$O of the external synchronous drive signal as shown in FIG. 8, the phase $\phi'$ of the read-out signals $r'$, $b'$ and $g'$ corresponding to the signals, R, B and G written in the previous rotation of the magnetic disk is given as $$\phi' = \phi M(T_M + {}_t) - \phi M(t) \quad (4)$$

where $T_M = (2\pi/\omega_M)$. Also, the phase $\phi$ of the read-out signals $r$, $b$ and $g$ read out in the next rotation of the magnetic disk is $$\phi = \phi_M(2T_M + t) - \phi_M(t) \quad (5)$$

These phase variations are indicated by curves $\phi'$ and $\phi$ in FIG. 8. This means that the simultaneous color signal outputs would be out of phase from one another, resulting in color fringing. In order to reduce this color fringing, it is necessary to reduce the rate of change of $\phi_M$. To this end, it is necessary to provide precise phase and speed control.

On the other hand, in case of synchronizing the entire system to the synchronizing signal written in the magnetic disk, in which the R, B and G signals are also recorded, $\phi_O$, $\phi'$, $\phi$ and $\phi_M$ will coincide without any phase difference involved among the converted simultaneous outputs, so that color reproduction of excellent quality may be obtained.

Figure 9:
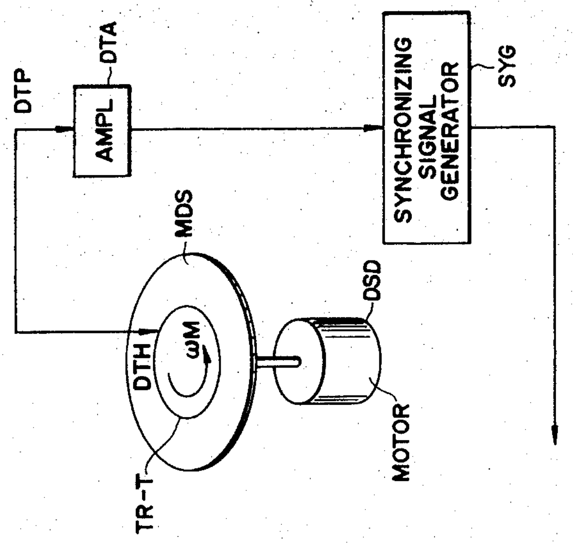
FIGS. 9 and 10 are schematic representations partly showing other embodiments of the invention.

FIG. 9 shows an embodiment based on the principles just described. In this embodiment, drive timing pulses DTP previously recorded in track TR–T of the magnetic disk MDS are detected by magnetic head DTH and amplified by read-out amplifier DTA, and the amplified drive timing pulses are fed to a synchronizing signal generator SYG, which produces the desired synchronizing signals, for instance horizontal and vertical synchronizing signals. Thus, the entire system can be synchronized to the output of the synchronizing signal generator SYG. In the NTSC system, the drive timing pulse frequency is selected to be $2f_H = 31.5$ kHz.

As has been shown, in the system whose drive synchronization is based on the synchronizing signal recorded in the memory, there is no relative phase difference among the simultaneous color signals through there may be absolute phase variation of the converted simultaneous outputs, so that the problem of color fringing may be overcome. However, for the display or recording of the converted output signals the absolute phase variation should be less than a limit, within which the deflection scanning for the display or the synchronizing function of the recording apparatus can follow it. Otherwise, stable transmission of the output signals cannot be expected.

Usually, a motor is used to drive the movable memory medium such as magnetic disk, magnetic sheet, magnetic drum, magnetic tape, etc. The motor inclusive of its load connected to its shaft is usually an oscillatory system. For example, for the hysteresis synchronous motor the ratio $Gm(s)$ between the phase of the drive current and that of the rotation of the output shaft (termed as transfer function of the motor) is given as $$Gm(s) = \omega_n^2/(s^2 + 2\,\zeta\,\omega_n s + \omega_n^2) \quad (6)$$

where $s$ is Laplace transform parameter, $\zeta$ is the logarismic attenuation constant, and $\omega_n$ is the angular frequency of free oscillation. Usually, the apparent $\zeta$ and $\omega_n$ are increased by some auxiliary means to repress the oscillation of the system so as to increase the frequency that can be transmitted. To this end, it is usual to provide differential and proportional control.

Figure 10:
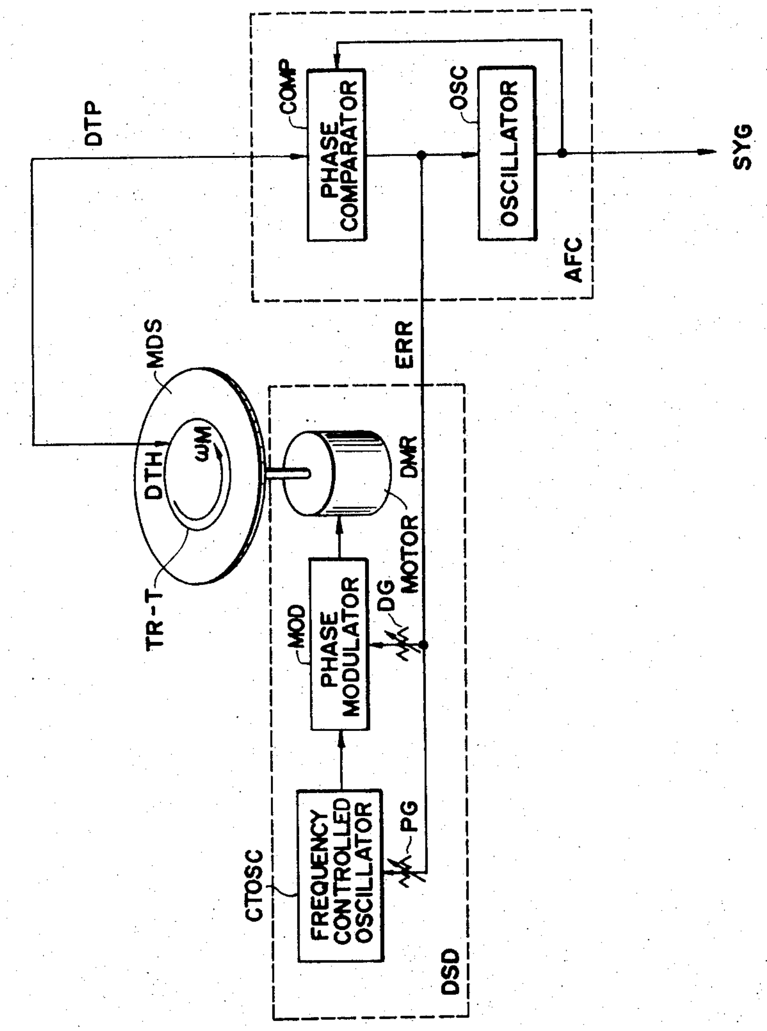

FIG. 10 shows an embodiment, in which the magnetic disk drive DMR is controlled on the basis of drive timing pulses DTP detected from the magnetic disk MDS, thereby ensuring smooth rotation of the magnetic memory medium and stability of the entire control system.

In operation, the drive timing pulse series DTP detected by the magnetic head DTH is fed to a phase comparator COMP, where it is phase compared with the output of an oscillator OSC oscillating at the same frequency $2f_H$ as that of the drive timing pulse series DTP, and the error signal ERR from the phase comparator COMP is used to control the oscillator OSC. The error signal ERR is also fed through a proportional control gain regulator PG to a frequency controlled oscillator CTOSC and also through a differential control gain regulator DG to a phase modulator MOD for the proportional control and differential control of the magnetic disk drive DMR. In this manner, the characteristic free oscillation of DMR can be repressed, and also external disturbance arising from bearings and other parts can be cancelled to ensure smooth rotation of the DMR. The phase comparator COMP and oscillator OSC constitute an automatic frequency control AFC. This type of drive motor control may be employed not only in the color television system, but it will also provide excellent effects when applied to the usual tape recorders and computer memories.

Figure 11:
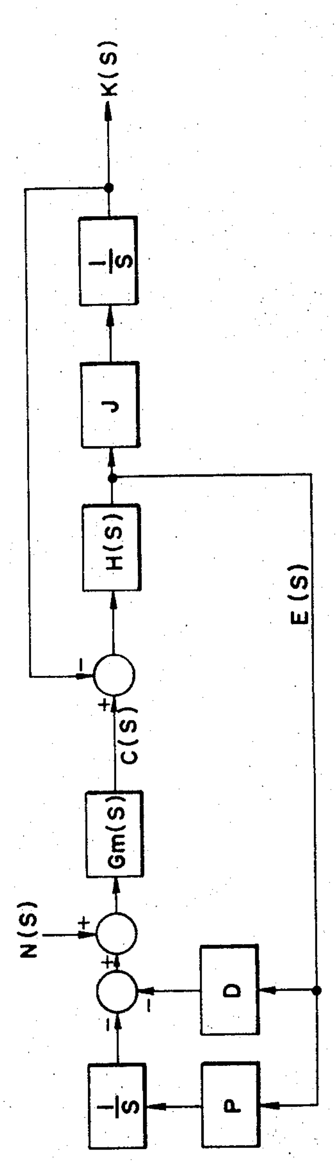
FIG. 11 is a block diagram showing the operation of the embodiment of FIG. 10.

The principles of this type of drive motor control will now discussed with reference to FIG. 11.

The ratio of the AFC output K(s) to AFC input C(s) is expressed as $$[K(s)]/C(s) = [H(s)J]/[S + H(s)J] \quad (7)$$

where $H(s)$ is transfer the function of the phase comparator in the AFC, J is the gain of the frequency controlled oscillator, and 1/S is an integral element of the frequency controlled oscillator. If the pulse frequency of the drive timing pulse series DTP is selected to be, for instance, $2f_H$, the phase comparator in the AFC handles frequencies far higher than those in a range treated in connection with the transfer function Gm(s) of the drive motor DMR. Therefore, H(s) can be regarded as a constant h. Then, $$[K(s)/C(s)] = hJ/[S + hJ] \tag{8}$$

If $\omega$ is lower than $hJ$, $K(\omega)/C(\omega) = 1$, while if $\omega$ is higher than $hJ$, $K(\omega)/C(\omega) = 1/j\ \omega$. This is known as the flywheel effect.

The ratio of the AFC error signal $E(s)$ to AFC input $C(s)$ is given as $$[E(s)/C(s)] = (hs)/(s + hJ) \tag{9}$$

Thus, if $\omega$ is lower than $hJ$, $E(\omega)/C(\omega) = j\omega/J$, so that a differential characteristic can be obtained. To provide a differential characteristic over a broad frequency range and increase the differential sensitivity, $J$ may be reduced.

Considering the response to the external noise $N(s)$ introduced into the control system, $$\frac{C(s)}{N(s)} = \frac{Gm(s)}{1+\left(\frac{P}{J}+\frac{P}{J}\,s\right)Gm(s)} = \frac{\omega'^{2}_{n}}{s^2+2\zeta\omega'_n s+\omega'_{n2}} \cdot \frac{1}{1+\frac{P}{J}} \tag{10}$$

$$\omega'_n = \sqrt{1 + (P/J)}\ \omega_n \tag{11}$$

$$\zeta' = (\zeta + (D/J)\omega_n)/\sqrt{1 + (P/J)} \tag{12}$$

where $P$ is gain of the frequency controlled oscillator CTOSC, and D is the gain of the phase modulator MOD. With increase in the angular frequency of the free oscillation of the motor as viewed from the point of introduction of the noise N(s) the logarismic attenuation constant is increased, which means that the motor condition is improved. The disturbance due to external noise is repressed as the response to N(s) becomes $1/[1 - (P/J)]$.

To summarize, the error signal of the AFC is utilized to repress the phase variation of the motor shaft caused by noise arising in the motor bearings, variation of the motor shaft load, noise and drift arising in the control system and so forth, to thereby increase the stability. Also, it is positively undertaken to increase the sensitivity of the phase comparator in the AFC and decrease the sensitivity of the frequency controlled oscillator, so as to increase the differential sensitivity of the AFC error signal, thus further enhancing the control effect.

In another aspect, in the sequential color image pick-up system, the residual image characteristic of the image pick-up tube greatly influences the color reproducibility.

In the photo-conductive type image pick-up tube such as a vidicon, the residual image is serious. Recent plumbicons provide residual image characteristics far superior compared to the conventional vidicon. However, they cannot be employed in the sequential color image pick-up system. Accordingly, it has been desired to realize some or other residual image compensating means that enable employing, for instance, the inexpensive visicon used in the industrial monochrome television camera in the color television camera from the standpoint of realizing an inexpensive color television camera.

There have heretofore been contemplated optical methods and electrical methods to compensate for the effect of the residual image. In accordance with the invention, an electric method of compensating for the residual image is adopted.

Figure 12:
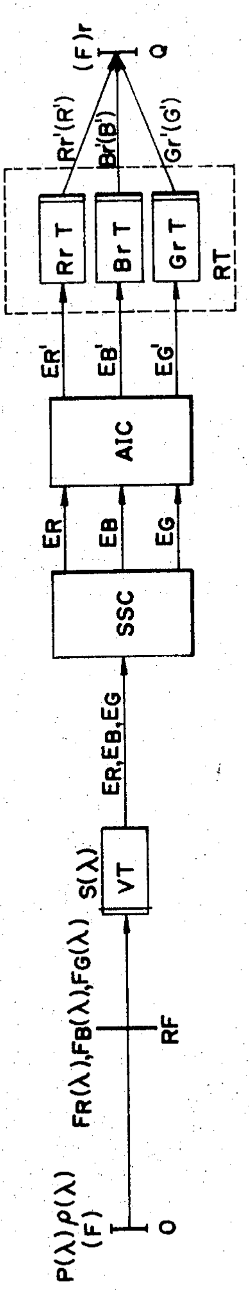
FIG. 12 is a block diagram showing a still another embodiment of the invention.

The principles of the residual image compensating method adopted in the color television system according to the invention will now be described with reference to FIG. 12.

The inter-relation between light from the scene O and the output of the sequential signal-simultaneous signal converter SSC is first discussed. Denoting the unit intensities of the three primary colors by (R'), (B') and (G'), the spectrum excitation intensities regarding the respective three primary colors by $\overline{r'}$, $\overline{b'}$ and $\overline{g'}$, the color (F) of the scene and the intensities R', B' and G' of the three primary colors are expressed as:

$$(F) = R'\,(R') + B'\,(B') + G'\,(G') \tag{13}$$

$$\left.\begin{aligned} R' &= \int P(\lambda)\,\rho\,(\lambda)\overline{r'}d\,\lambda \\ B' &= \int P(\lambda)\,\rho\,(\lambda)\overline{b'}d\,\lambda \\ G' &= \int P(\lambda)\,\rho\,(\lambda)\overline{g'}d\,\lambda \end{aligned}\right\} \tag{14}$$

where $P(\lambda)$ is the coefficient of spectral structure of the foreground subject in the scene, and $\rho\ (\lambda)$ is the spectral reflection coefficient of the foreground subject in the scene. If the input-to-output characteristic of the image pick-up device VT and converter SSC is linear, the three color output signals $E_R$, $E_B$ and $E_G$ from VT or SSC are respectively proportional to $R'$, $B'$ and $G'$, so they are expressed as:

$$\left.\begin{aligned} E_R &= \int P(\lambda)\,\rho\,(\lambda)F_R(\lambda)S(\lambda)d\lambda \\ E_B &= \int P(\lambda)\,\rho\,(\lambda)F_B(\lambda)S(\lambda)d\,\lambda \\ E_G &= \int P(\lambda)\,\rho\,(\lambda)F_G(\lambda)S(\lambda)d\,\lambda \end{aligned}\right\} \tag{15}$$

where $F_R(\lambda)$, $F_B(\lambda)$ and $F_G(\lambda)$ are respective spectral transmitting coefficients of the R, B and G transmitting parts of the color filter, and $S(\lambda)$ is the spectral sensitivity of the image pick-up device VT.

Next, the relation between the inputs and outputs of an image reproducing system for converting electric signals into optical image is given. Denoting the luminescent intensities of the three primary colors by $Rr'$, $Br'$ and $Gr'$, the color $(F)r$ at point $Q$ on the receiver screen is given as $$(F)r = Rr'(R') + Br'(B') + Gr'(G') \quad (16)$$

If the relation between the input signals to RT and the corresponding luminescent intensities of the three primary colors is linear, $$\left.\begin{aligned} Rr' &= k_r E_R' \\ Br' &= k_r E_B' \\ Gr' &= k_r E_G' \end{aligned}\right\} \quad (17)$$

where $k_r$ is the sensitivity of $RT$, and $E_R'$, $E_B'$ and $E_G'$ represent the respective residual image compensated red, blue and green video signals. For the high fidelity reproduction of a color picture it is necessary that the chromaticity of (F) is equal to that of $(F)r$ and the luminosity of the former is proportional to that of the latter. Thus, the intensities of the three primary colors intensities in the former should be proportional to those in the latter. Stated mathematically, $$(F)r = C(F) \quad (18)$$

$$\left.\begin{aligned} Rr' &= CR' \\ Br' &= CB' \\ Gr' &= CG' \end{aligned}\right\} \quad (19)$$

where $P$ is a proportionality constant.

In order for these conditions to be satisfied independently of $P(\lambda)\ \rho\ (\lambda)$, it is sufficient if the spectral parameters in the image pick-up system are made proportional to the spectrum excitation intensities regarding the respective three primary colors, that is, $$\left.\begin{aligned} F_R(\lambda)S(\lambda) &= k\bar{r}' \\ F_B(\lambda)S(\lambda) &= k\bar{b}' \\ F_G(\lambda)S(\lambda) &= k\bar{g}' \end{aligned}\right\} \quad (20)$$

where $k$ is a proportionality constant.

In the above relations, the effects of the residual image are ignored. The discussion will now be expanded to the case where residual images are involved in the VT of the image pick-up system. Generally, the output signal of the image pick-up tube is a function of $a^n$, where a is the residual image ratio and $n$ ($n = 0, 1, 2, \ldots$) is the number of read-outs after interrupting the exposure. The residual image ratio a is different with different image pick-up tubes; about 0.7 in the case of a visicon and about 0.4 in the case of a plumbicon. Thus, when the effect of the residual image is present, the three color output signals $E_R$, $E_B$ and $E_G$ from VT or SSC are given as $$\left.\begin{aligned} E_R &= \int P(\lambda)\rho(\lambda)\{F_R(\lambda)+aF_G(\lambda)+a^2F_B(\lambda)\}(1+a^3)S(\lambda)d\lambda \\ E_B &= \int P(\lambda)\rho(\lambda)\{F_B(\lambda)+aF_R(\lambda)+a^2F_G(\lambda)\}(1+a^3)S(\lambda)d\lambda \\ E_G &= \int P(\lambda)\rho(\lambda)\{F_G(\lambda)+2F_B(\lambda)+a^2F_R(\lambda)\}(1+a^3)S(\lambda)d\lambda \end{aligned}\right\} \quad (21)$$

Figure 13:
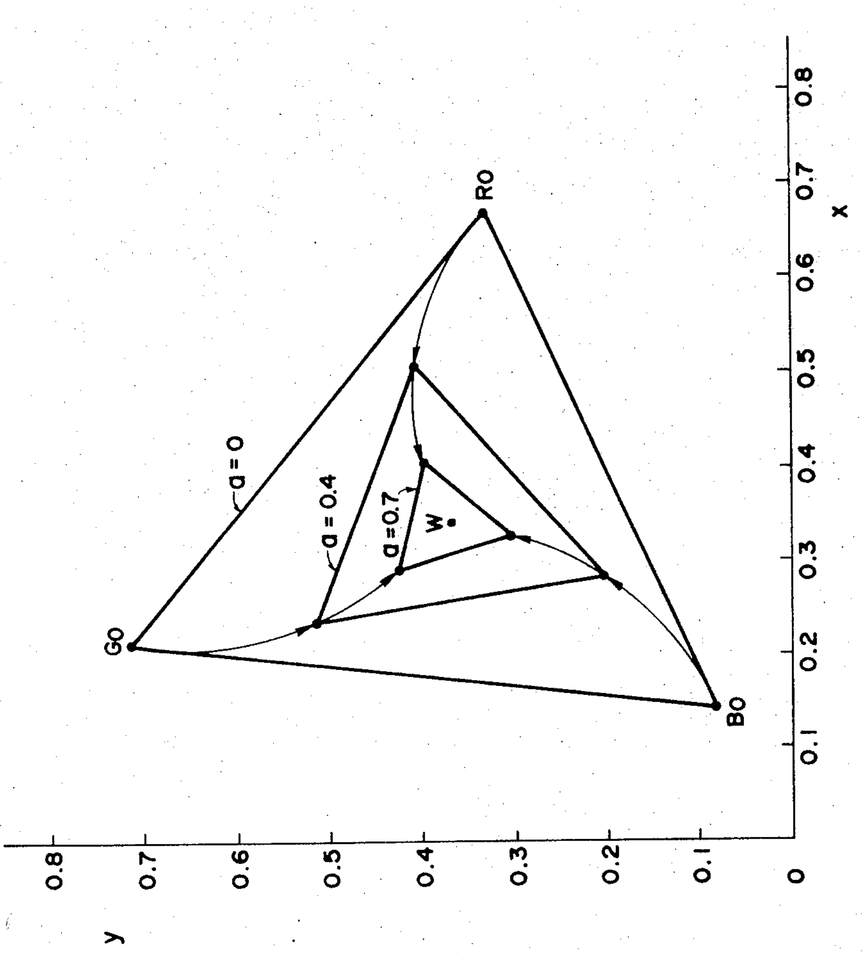
FIG. 13 shows a CIE chromaticity diagram in the chromaticity co-ordinates.

If $F_R(\lambda)$, $F_B(\lambda)$ and $F_G(\lambda)$ are so determined that equations 20 are satisfied, the effect of the residual image can be represented by a chromaticity diagram as shown in FIG. 13. In the Figure, $x$ and $y$ designate the CIE chromaticity co-ordinate axes, $R_O$, $B_O$ and $G_O$ represent the chromaticities of the three primary colors adopted in the NTSC system, and $w$ represent the chromaticity of standard white. As is seen from the Figure, with increase in the residual image ratio the primary color chromaticities are gradually reduced to $w$ while revolving in the left-hand direction about $w$.

If the characteristics of the image pick-up tube VT satisfy the condition of equations 20, the tube provides output signals $E_R$, $E_B$ and $E_G$ defined by the equations 21. To compensate for the effect of the residual image, a residual image compensating means AIC is provided in the system of FIG. 12. If $E_R$, $E_B$ and $E_G$ are converted by AIC into signals $E_R'$, $E_B'$ and $E_G'$ are given as $$\left.\begin{aligned} E_R' &= \int P(\lambda)\ \rho\ (\lambda)F_R(\lambda)S(\lambda)d\lambda \\ E_B' &= \int P(\lambda)\ \rho\ (\lambda)F_B(\lambda)S(\lambda)d\lambda \\ E_G' &= \int P(\lambda)\ \rho\ (\lambda)F_G(\lambda)S(\lambda)d\lambda \end{aligned}\right\} \quad (22)$$

the conditions of equations 18 and 19 for the color picture reproduction with fidelity will be satisfied. From the equations 21 and 22, $E_R'$, $E_B'$ and $E_G'$ are expressed as $$\left.\begin{aligned} E_R' &= E_R - aE_G \\ E_B' &= E_B - aE_R \\ E_G' &= E_G - aE_B \end{aligned}\right\} \quad (23)$$

Thus, an arithmetic circuit to perform the operation of equations 23 may be used as the residual image compensating means AIC.

Figure 14:
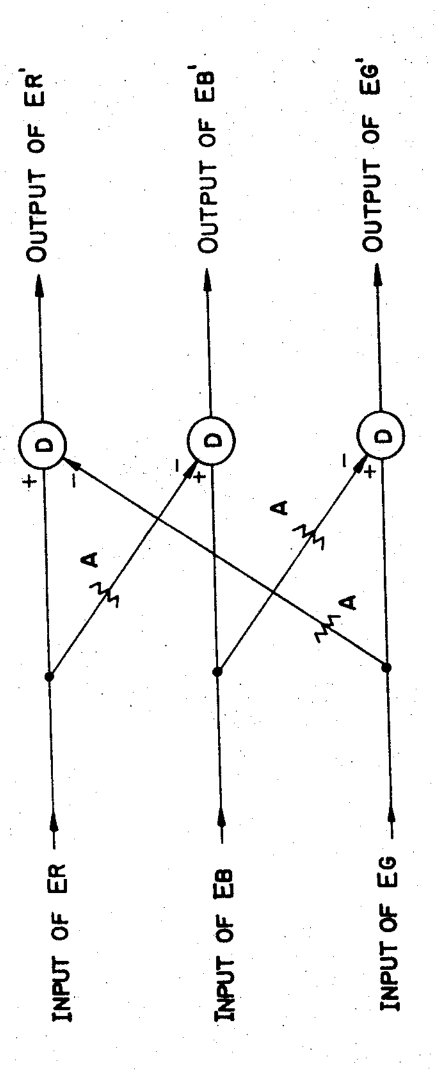
FIG. 14 is a schematic representation of part of the embodiment of FIG. 12.

FIG. 14 shows such an arithmetic circuit. It has three subtracting units D and three attenuators A with an attenuation factor of $a$. With this construction, $aE_G$, $aE_R$ and $aE_B$ are subtracted from the respective inputs $E_R$, $E_B$ and $E_G$ to provide the output signals $E_R'$, $E_B'$ and $E_G'$. In this manner, the effect of the residual image may be readily compensated for.

As has been described in the foregoing, according to the invention it is possible to provide a color television system, which is small in size, light in weight and capable of readily converting sequential color television signals into simultaneous color television signals, requires no manual adjustment to maintain the required performance, and is capable of using image pick-up tubes of the type causing large residual images such as vidicons. Also, high quality color picture reproduction free from color fringing may be ensured by appropriately controlling the memory drive.

What we claim is:

1. A color television system comprising:

an image pickup device for producing sequential color information signals representing three color components of an object field;

means for recording said sequential color information signals on a recording medium;

means for reproducing the color information signals recorded on said recording medium respectively one field scansion interval and two field scansion intervals after the recording;

three switching means, one for each color component, each switching means having a first, second and third input terminals and an output terminal and being operable so as to successively switch said output terminal to one of said input terminals at every one field scansion interval, said first input terminal being fed with the sequential color information signal from said image pickup device, said second and third input terminals being fed with the color information signals reproduced by said reproducing means respectively with a delay of one field scansion interval and two field scansion intervals, whereby a simultaneous color information signal is obtained through said output terminal; and means for delaying, by one-half the horizontal scansion period, the color information signal to be applied to one of said second and third input terminals.

2. The color television system according to claim 1, wherein said delaying means comprises at least one delay line delaying the color signal taken out of said recording means by one-half the horizontal scanning line.

3. The color television system according to claim 1, wherein said recording means and said switching means jointly comprise a rotary recorder provided with a signal imparting means and two signal detecting means, said recorder being adapted to be rotated such that said three component color signals are sequentially recorded in one rotation of said recorder, one of said two signal detecting means detecting the recorded signal recorded through said signal imparting means an interval Tv ± ½H (*Tv* being one field period and *H* being one horizontal scanning period) after the recording, and the other of said signal detecting means detecting the recorded signal an interval 2 *Tv* after the recording, whereby any desired one of said two component color signals taken out of said recording means is shifted in time by one half the horizontal line.

4. The color television system according to claim 1, which further comprises a frequency converter to change the frequency $f_v$ of a drive signal for operating said color television system into a frequency $f_v'$ given as $$f_v' = f_v \cdot (2f_H/2f_H \pm f_v)$$

where $f_H = 1/H$ (*H* being one horizontal scanning period), said recording means being driven in accordance with the output signal of said frequency converter.

5. The color television system according to claim 1, wherein a synchronizing signal is previously recorded in said recording means, and which further comprises means to detect said synchronizing signal, and means to produce a drive signal for operating said color television system from the output signal of said synchronizing signal detecting means.

6. The color television system according to claim 1, wherein a synchronizing signal is previously recorded in said recording means, and which further comprises means to detect said synchronizing signal, a reference frequency oscillator, and means to compare the output signal of said synchronizing signal detecting means and the output signal of said reference frequency oscillator, said comparing means providing an error signal, the drive of said recording means and said reference frequency oscillator being controlled in accordance with said error signal, and the output signal of said reference frequency oscillator being used as a drive signal for operating said color television system.

7. The color television system according to claim 1, which further comprises a residual image compensating means coupled to receive said three component color signals, said image compensating means comprising three subtracting units connected to the respective three transmission lines for said three component color signals, and three attenuators to attenuate the corresponding component color signals to a required extent, each of the attenuated signals being fed to a subtracting unit connected to a transmission line for a component color signal produced one field after each said attenuated signal.

8. A color television system comprising:

first means, responsive to an input information image, for generating a pluraliy of sequential color information signals representative of plural color components of an object field; and second means, responsive to the output of said first means, for converting said sequential color information signals into a plurality of synchronized continuous sequences of simultaneous color information signals, each continuous sequence corresponding to one of said plural color components of said object field, wherein said second means comprises:

means for recording said sequential color information signals, means for reproducing color information signals recorded by said recording means with respective one and two field scansion intervals subsequent to the recording of said color information signals by said recording means, including first switch means, coupled between the output of said first means and said reproducing and recording means for controlling the write-in and read-out of color information signals with respect to said recording means, and a plurality of delay means for delaying respective ones of the signals read-out from said recording means by said first switch means by one-half a horizontal scansion period, and second switch means, coupled to the outputs of said first means, said first switch means and said delay means, for controlling the generation of said continuous sequences of simultaneous color information signals.

9. A color television system comprising:

first means, responsive to an input information image, for generating a plurality of sequential color information signals representative of plural color components of an object field; and second means, responsive to the output and said first means, for converting said sequential color information signals into a plurality of synchronized continuous sequences of simultaneous color information signals, each continuous sequence corresponding to one of said plural color components of said object field, wherein said second means comprises a rotary recorder provided with signal write-in means and a pair of signal read-out means, said recorder being rotated such that said plurality of color information signals are sequentially recorded during one rotation of said recorder, one of said pair of signal read-out means detecting the signal recorded through said signal write-in means and interval $Tv \pm \frac{1}{2} H$, wherein $Tv$ is one field period and $H$ is one horizontal scansion period, after the recording, and the other of said signal read-out means detecting the recorded signal $2Tv$ after the recording, so that any desired one of said two color information signals read-out of said recorder is shifted in time by one-half a horizontal line.

10. A color television system according to claim 9, wherein said second means further comprises respective switch means having a plurality of input terminals respectively connected in parallel with said signal write-in means and said pair of signal read-out means, an output terminal for providing said simultaneous color information signals, and switching contact means connecting a respective one of said input terminals to the output terminal, and means for synchronizing the position of said contact means with said rotary recorder.

11. A color television system comprising:

first means, responsive to an input information image, for generating a plurality of sequential color information signals representative of plural color components of an object field; and second means, responsive to the output of said first means, for converting said sequential color information signals into a plurality of synchronized continuous sequences of simultaneous color information signals, each continuous sequence corresponding to one of said plural color components of said object field wherein said second means includes a recording means for recording the sequential color information signals produced by said first means and wherein said system further comprises a frequency converter to change the frequency $f_v$ of a drive signal for operating said color television system into a frequency $f_v'$ given as $$f_v' = f_v \cdot (2f_H)/(2f_H \pm f_v)$$

where $f_H = (1/H)$ ($H$ being one horizontal scanning period), said recording means being driven in accordance with the output signal on said frequency converter.

12. A color television system comprising:

first means, responsive to an input information image, for generating a plurality of sequential color information signals representative of plural color components of an object field; and second means, responsive to the output of said first means, for converting said sequential color information signals into a plurality of synchronized continuous sequences of simultaneous color information signals, each continuous sequence corresponding to one of said plural color components of said object field, wherein said second means includes means for recording the sequential color information signals produced by said first means and wherein a synchronizing signal is previously recorded in said recording means, and which further comprises means to detect said synchronizing signal, and means to produce a drive signal or operating said color television system from the output signal of said synchronizing signal detecting means.

13. A color television system comprising:

first means, responsive to an input information image, for generating a plurality of sequential color information signals representative of plural color components of an object field; and second means, responsive to the output of said first means, for converting said sequential color information signals into a plurality of synchronized continuous sequences of simultaneous color information signals, each continuous sequence corresponding to one of said plural color components of said object field, wherein said second means includes means for recording the sequential color information signals produced by said first means and wherein a synchronizing signal is previously recorded in said recording means, and which further comprises means to detect said synchronizing signal, a reference oscillator, and means to compare the output signal of said synchronizing signal detecting means and the output signal of said reference frequency oscillator, said comparing means providing an error signal, the drive of said recording means and said reference frequency oscillator being controlled in accordance with said error signal, and the output signal of said reference frequency oscillator being used as a drive signal for operating said color television system.

14. A color television system comprising:

first means, responsive to an input information image, for generating a plurality of sequential color information signals representative of plural color components of an object field; and second means, responsive to the output of said first means, for converting said sequential color information signals into a plurality of synchronized continuous sequences of simultaneous color information signals, each continuous sequence corresponding to one of said plural color components of said object field, and further comprising a residual image compensating means coupled to receive said plurality of color information signals, said image compensating means comprising a plurality of subtracting circuits connected to the respective transmission lines for said plurality of color information signals, corresponding to said color components, and a plurality of attenuators for attenuating the corresponding component color signals to a prescribed amount, each of said attenuated signals being delivered to a subtracting circuit connected to a transmission line for a color component signal produced one field subsequent to each said attenuated signal.

* * * * *